(No Model.)
2 Sheets—Sheet 1.
F. HURLBUT.
DENTAL SPITTOON.
No. 563,664.    Patented July 7, 1896.
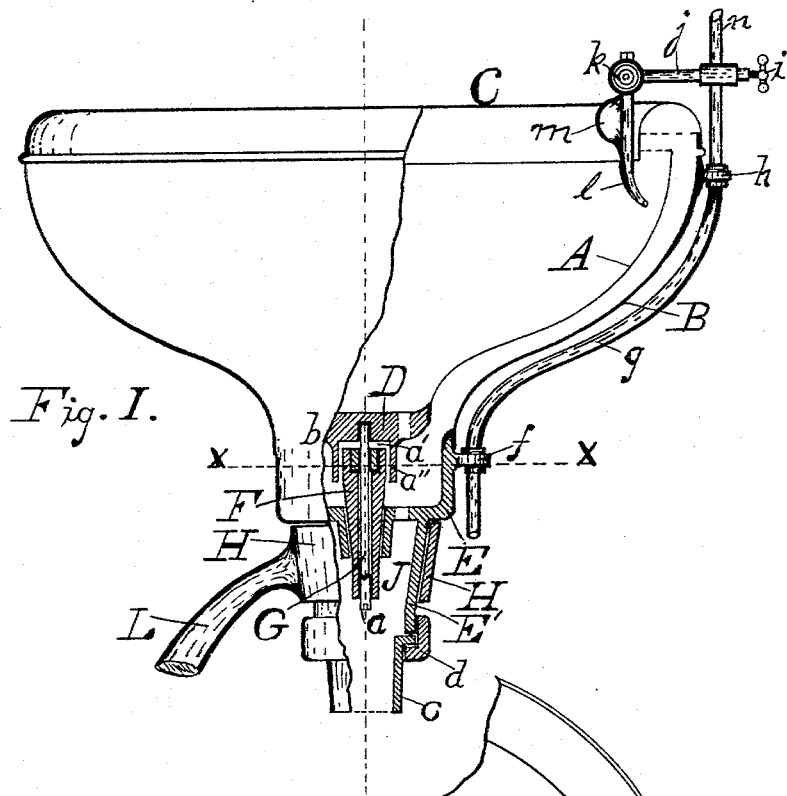
Fig. 1.
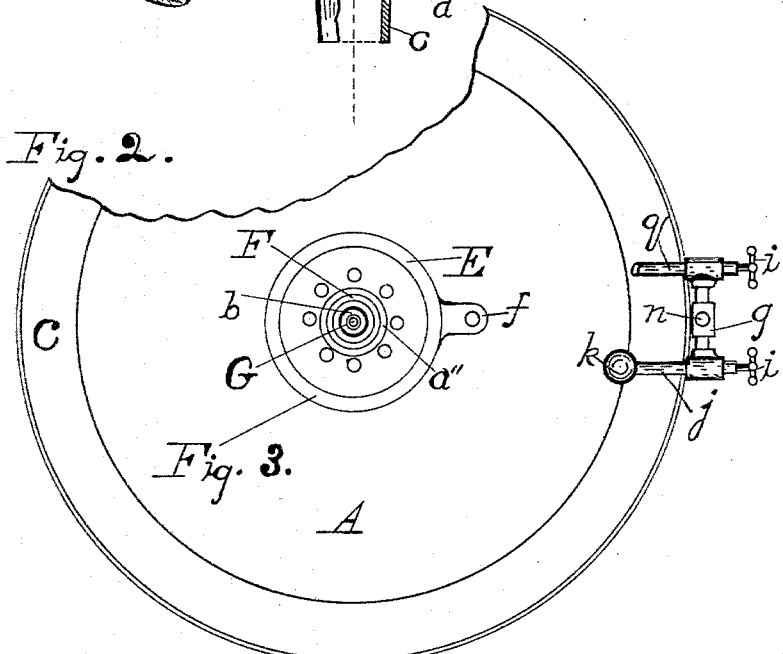
Fig. 2.
Fig. 3.
Witnesses:
G. Dampell
E. M. Clark
Inventor.
Frank Hurlbut
By E. McG. Turner
Attorney.

(No Model.) 2 Sheets—Sheet 2.

F. HURLBUT.
DENTAL SPITTOON.

No. 563,664. Patented July 7, 1896.

Witnesses
J. Clark
E. M. Clark

Inventor
Frank Hurlbut
By E. McG. Turner.
Attorney.

UNITED STATES PATENT OFFICE.

FRANK HURLBUT, OF CHICAGO, ILLINOIS, ASSIGNOR OF ONE-HALF TO PRUDENCE MAY CLARK, OF SAME PLACE.

DENTAL SPITTOON

SPECIFICATION forming part of Letters Patent No. 563,664, dated July 7, 1896.

Application filed March 18, 1895. Serial No. 542,280. (No model.)

*To all whom it may concern:*

Be it known that I, FRANK HURLBUT, a citizen of the United States, residing at Chicago, in the county of Cook and State of Illinois, have invented a new and useful Improvement in Dental Spittoons, of which the following is a specification.

My invention relates to that class of spittoons used by dentists, physicians, and other specialists where it is desirable to have running water in the spittoon for the purpose of cleansing the same.

For further description of my invention reference will be had to the following specification, in which—

Figure 4:
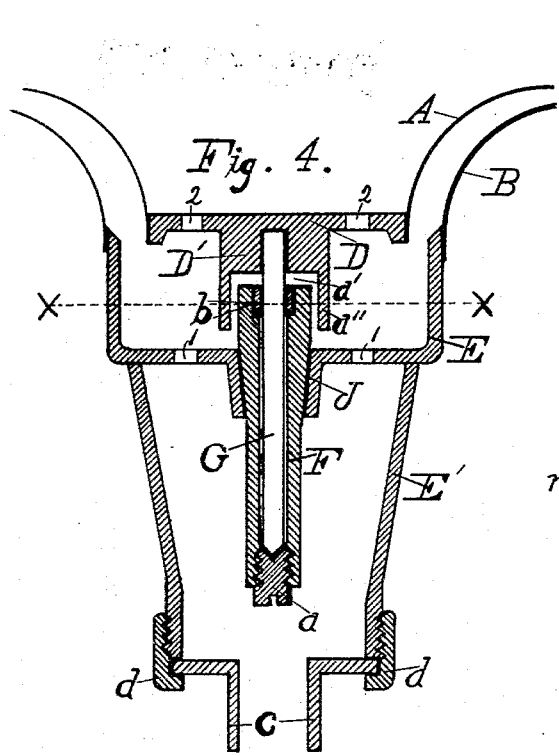
Figure 7:
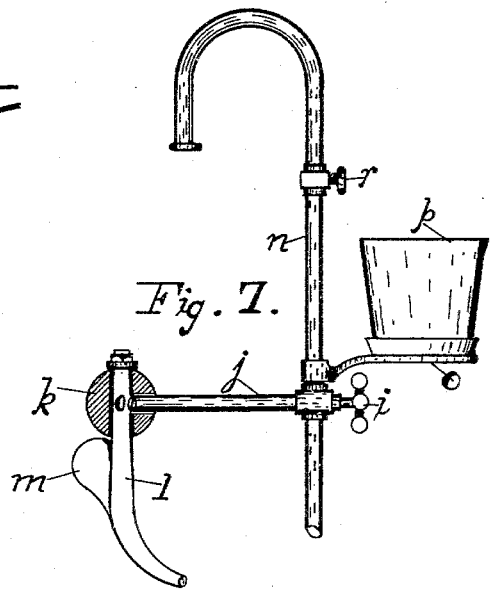
Figure 5:
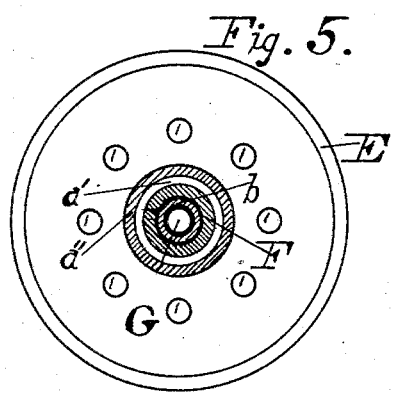
Figure 6:
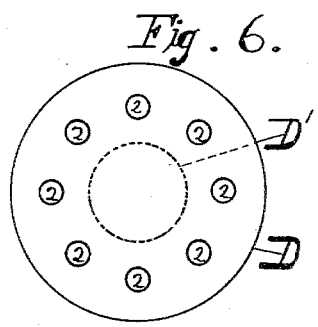

Figure 1 is an elevation of my invention, the right half being in section. Fig. 2 is a plan view of the same. Fig. 3 is a transverse section on line X X of Fig. 1. Fig. 4 is an enlarged vertical section of the parts shown in section at the lower end of Fig. 1. Fig. 5 is a plan view of the fixture E, showing the perforations 1 1 through the bottom plate of the same. Fig. 6 is a plan view of the fixture D, showing the perforations 2 2 in the plate of the same. Fig. 7 is a side elevation of the valve fixtures and section, showing one style of swiveled injector *l*. Any style or pattern of swiveled injector will serve the purpose.

My improvement may be attached to a permanent or a movable stand or to the wall or to some part of an operating-chair and is further provided with an outer and an inner bowl, the outer bowl remaining stationary upon the fixtures, while the inner bowl may be continuously rotated by means of the water discharged against its inner surface through the injector *l*.

Similar characters refer to corresponding parts in all the figures.

A represents the inner bowl, which is movable upon a pivot, as hereinafter described.

B represents the outer bowl, which is stationary upon its fixtures.

C is a removable cap or rim fitted upon the top of the outer bowl B and extends over and inside of the upper edge of the inner bowl A. The cap C is made removable, so that the inner bowl A may be lifted out for the purpose of cleansing the parts.

D is a plate, providing the perforated bottom of the bowl A, and is provided on its under side with a hub D'. The hub D' is provided with a central socket, also the downward-extending shell *a''*. Into the socket is fitted a pivot-stem G. The drawing discloses the pivot-stem G as loosely fitted into the socket of the hub D'. It is immaterial whether it be loosely fitted or rigid.

E is a solid fixture forming the bottom of the outer bowl B and is provided on its under side with a hub J. The hub is provided with a cone-shaped opening, into which is fitted a socket-post F. The fixture E is also provided with the cone-shaped shell E', extending downward to the fixtures *c* and *d*, connecting it with a waste-pipe. The bottom of the fixture E is perforated, as shown at 1 1, Fig. 5.

F is a tubular post, cone-shaped near its upper end and is thus fitted into the cone-shaped opening in the hub J of the fixture E. Into the lower end of the post F is fitted an adjustable bolt *a*. The bolt *a* being adjustable, it may be raised and thus provide a bearing for the pivot-stem G.

G is a pivot-stem, on which is mounted the revolving bowl A.

H represents a socket on the end of an arm L of any suitable fixture for securing the spittoon in any desired position or to any desired object.

*a* is an adjustable stool-bolt fitted into the end of the socket-post F, and in addition to providing a pivot-bearing for the pivot-stem G it provides a means of adjusting the inner bowl A up or down.

*b* is an annular ring of hardened metal fitted into the upper end of the post F to provide a side bearing for the pivot-stem G.

*c* is a fixture secured to the lower end of the chamber formed by the shell E' by means of the lock-nut *d*, and is for the purpose of connecting the spittoon to a waste-pipe.

*f* and *h* are fixtures provided on the side of the outer bowl B for supporting the supply-pipe and may be connected in suitable manner to any waste-pipe or hydrant.

*g* is the water-supply pipe supported by the fixtures *f* and *h*, and provided near to the top of the bowl with an ordinary cross-pipe fitting, the lower arm of the cross being attached to the supply-pipe *g*. (See Figs. 2 and 7.) The upper arm may be extended and provided with a glass filler *n*. (See Fig. 7.) The two side arms of the cross may be extended and provided each with an ordinary stop-cock $i$ $i$. (See Fig. 2.)

$j$ is an extension from one of the valves $i$ and connects the same with the globe $k$.

$k$ is a globe-shaped fixture provided with a two-way opening, into one of which is fitted the pipe $j$ and through the other extends the injector $l$.

$l$ is the injector, through which water is discharged into the bowl A. This injector is fitted through the globe $k$ and is designed to swivel in the same. The lower end of the injector terminates with a bent nozzle. At one side of the injector is provided a thumb-piece $m$ for the purpose of turning the same in the globe $k$.

The upper end of the injector $l$, at a point opposite the pipe $j$, is provided with one or more openings, so that water may be admitted to the injector regardless of the angle at which the nozzle may be set, the inflow of water being controlled by the valve $i$. The valves $i$ $i$ are connected with the cross-pipe fitting with the swivel-joint, so that the fixtures extending inside of the bowl may be turned upward on the swivel-joint and thereby removed from over the bowl in order that the inner bowl may be removed for the purpose before described.

$o$ is a bracket fitted loosely around and extending from the pipe $n$ for supporting a waterglass $p$. Desiring to fill the glass the bracket $o$ may be swung around, bringing the glass under the water-pipe $n$.

$r$ is a stop-cock on the pipe $n$.

$q$ is an extension from one of the valves $i$, and to which it is intended to connect a saliva-ejector.

The operation of my invention is as follows: Assume the spittoon to be in position resting in the socket H of the arm L, said arm L being secured as before described and the water-pipe $g$ being connected with a supply-pipe by a section of hose or otherwise, as desired, and the fixture $c$ being likewise connected with a waste-pipe. Desiring to operate the bowl the operator will open the stop-cock $i$ opposite the injector $k$ $l$, admitting water to the bowl through the nozzle end of the injector $l$. By means of the thumb-piece $m$ the injector may be turned so as to discharge the water against the inner surface of the bowl A at any angle desired. The force of the water thus discharged imparts motion to the inner bowl and causes it to revolve upon its pivot-stem G. The speed at which the bowl revolves is controlled by the force of the supply and the angle at which the injector is set. The outlet from the bowl is through the perforations 2 2 and 1 1 of the plates D and E and thence through fixture $c$ to the waste-pipe. (See Figs. 4, 5, and 6.) In the event of an overflow of the bowl A the water may pass down the space between the outer and inner bowl and through the plate E to the waste-pipe.

The air-space $a'$, provided between the upper end of the post F and the under side of the hub D′, and inclosed by the downward-extending shell $a''$ of the hub D′, is intended to act as a ram in preventing water from working up over the post F and around the pivot-stem G.

Having thus described my invention, what I claim as new, novel, and desire to secure by Letters Patent of the United States, is—

1. In a spittoon, an inner and an outer bowl, the inner bowl being revoluble; and a water-injector adapted to direct a jet of water against said revoluble bowl to revolve the same.

2. A dental spittoon having an outer and an inner bowl, the inner bowl being revoluble within the outer bowl; a water-injector adapted to throw a stream of water against the inner surface of the inner bowl; and an adjustable fixture carrying the injector by which it is made removable from the inner bowl.

3. In a dental spittoon, an inner and an outer bowl, the inner bowl being revoluble; a water-injector held to direct water against the inner surface of the inner bowl to revolve the same; and a fixture which holds the water-injector, the water-injector being adjustable in the fixture to change the direction of the stream which it directs against the revoluble bowl to modify the speed of the revolution of the bowl.

4. In a dental spittoon, an outer bowl and an inner bowl, the inner bowl being revoluble in the outer bowl; the water-injector for directing the stream of water against the surface of the inner bowl to revolve the same; and a removable cap placed over the upper edges of the two bowls secured to the outer bowl.

5. In a spittoon, a bowl A with a perforated bottom D; a centrally-disposed downward extension D′ adapted to receive a spindle G; an annular projection $a''$ inclosing the upper end of the cylindrical post F; and the post F forming a bearing for the said spindle G.

6. In a spittoon, the upright waste-pipe $c$, and an enlargement E′; a perforated top upon the said enlargement; a hub J in the said top; a hollow cylindrical post F in the said hub; a spindle G mounted in the said post, carrying the bowl A; and a chamber formed by an annular rim E upon the said enlargement E′.

7. In a spittoon, the waste-pipe $c$; an enlargement E′; a perforated top upon the said enlargement; a hub J in the said top; a hollow cylindrical post F in the said hub; a spindle G mounted in said post carrying the bowl A; a chamber formed by an annular rim E upon the said enlargement E′; an outer bowl B mounted upon the rim E, so that the annular space between the said bowls communicates with the said chamber.

FRANK HURLBUT.

Witnesses:
AUG. F. CONAHAN,
J. S. CLARK.